US012717047B2

(12) United States Patent
Boucher et al.

(10) Patent No.: US 12,717,047 B2
(45) Date of Patent: Aug. 25, 2026

(54) MULTI-STAGE PIXEL ARCHITECTURE FOR SYNCHRONOUS READ/INTEGRATE RADIATION IMAGING, AND RELATED SYSTEMS, DEVICES AND METHODS

(71) Applicant: Analogic Corporation, Melrose, MA (US)

(72) Inventors: Francois Boucher, Montreal (CA); Anastasiia Mishchenko, Montreal (CA); Luc Laperriere, Montreal (CA)

(73) Assignee: Analogic Corporation, Melrose, MA (US)

( * ) Notice: Subject to any disclaimer, the term of this patent is extended or adjusted under 35 U.S.C. 154(b) by 200 days.

(21) Appl. No.: 17/906,609

(22) PCT Filed: Mar. 18, 2021

(86) PCT No.: PCT/IB2021/052290
§ 371 (c)(1),
(2) Date: Sep. 16, 2022

(87) PCT Pub. No.: WO2021/186393
PCT Pub. Date: Sep. 23, 2021

(65) Prior Publication Data

US 2023/0168391 A1 Jun. 1, 2023

Related U.S. Application Data

(60) Provisional application No. 62/991,518, filed on Mar. 18, 2020.

(51) Int. Cl.
*G01T 1/17* (2006.01)
*H04N 23/30* (2023.01)
(Continued)

(52) U.S. Cl.
CPC .............. *G01T 1/17* (2013.01); *H04N 23/30* (2023.01); *H04N 25/30* (2023.01);
(Continued)

(58) Field of Classification Search
None
See application file for complete search history.

(56) References Cited

U.S. PATENT DOCUMENTS 7,995,113 B2 8/2011 Karim et al.
8,039,811 B1 10/2011 Li et al.
(Continued)

FOREIGN PATENT DOCUMENTS

JP 2010-051689 A 3/2010
JP 2011-071631 A 4/2011
(Continued)

OTHER PUBLICATIONS

International Search Report for International Application No. PCT/IB2021/052290, mailed May 28, 2021, 7 pages.
(Continued)

*Primary Examiner* — Edwin C Gunberg
(74) *Attorney, Agent, or Firm* — TraskBritt

(57) ABSTRACT

Embodiments of a multi-stage pixel architecture for radiation imaging, and related detectors and radiation imaging systems including the same are described. Embodiments of methods of performing synchronous read/integrate using pixels described herein are also described.

27 Claims, 5 Drawing Sheets

(51) Int. Cl.
*H04N 25/30* (2023.01)
*H04N 25/771* (2023.01)
*H04N 25/772* (2023.01)
*H04N 25/778* (2023.01)

(52) U.S. Cl.
CPC ......... *H04N 25/771* (2023.01); *H04N 25/772* (2023.01); *H04N 25/778* (2023.01)

(56) References Cited

U.S. PATENT DOCUMENTS

| | | | |
|---|---|---|---|
| 2004/0135911 | A1 | 7/2004 | Nathan et al. |
| 2005/0157194 | A1* | 7/2005 | Altice, Jr. ............ H04N 25/589 348/E3.018 |
| 2007/0104311 | A1 | 5/2007 | Possin et al. |
| 2008/0149843 | A1* | 6/2008 | Tredwell ................ H04N 25/76 348/E3.018 |
| 2011/0068257 | A1 | 3/2011 | Maeda et al. |
| 2011/0260039 | A1 | 10/2011 | Fowler |
| 2011/0267510 | A1 | 11/2011 | Malone et al. |
| 2013/0068955 | A1 | 3/2013 | Matsuura |
| 2014/0104463 | A1 | 4/2014 | Spears et al. |
| 2015/0085980 | A1 | 3/2015 | Kitano et al. |
| 2017/0016765 | A1 | 1/2017 | Maillart |

FOREIGN PATENT DOCUMENTS

| | | | |
|---|---|---|---|
| JP | 2012-019286 | A | 1/2012 |
| JP | 2013-062792 | A | 4/2013 |
| JP | 2016-208116 | A | 12/2016 |
| JP | 2017-108853 | A | 6/2017 |
| JP | 2018-074268 | A | 5/2018 |
| WO | 2018/208668 | A1 | 11/2018 |

OTHER PUBLICATIONS

International Written Opinion for International Application No. PCT/IB2021/052290, mailed May 28, 2021, 5 pages.

Invitation to pay additional fee received for PCT Patent Application No. PCT/IB2021/052290, mailed on Apr. 23, 2021, 2 pages.

European Extended Search Report and Opinion for European Application No. 21771179.5, dated Dec. 1, 2023, 16 pages.

Japanese Notice of Reasons for Rejection for Japanese Application No. 2022-557134, dated Dec. 11, 2023, 18 pages with English translation.

Notice of Reasons for Rejection of Japanese Patent Application No. 2022-557134, mailed May 20, 2024, 15 pages with English translation.

European Communication pursuant to Article 94(3) EPC for European Application No. 21771179.5, dated Mar. 26, 2025, 6 pages.

* cited by examiner

MULTI-STAGE PIXEL ARCHITECTURE FOR SYNCHRONOUS READ/INTEGRATE RADIATION IMAGING, AND RELATED SYSTEMS, DEVICES AND METHODS

CROSS-REFERENCE TO RELATED APPLICATIONS

This application is a national phase entry under 35 U.S.C. § 371 of International Patent Application PCT/IB2021/052290, filed Mar. 18, 2021, designating the United States of America and published as International Patent Publication WO 2021/186393 A1 on Sep. 23, 2021, which claims the benefit under Article 8 of the Patent Cooperation Treaty to U.S. Patent Application Ser. No. 62/991,518, filed Mar. 18, 2020.

TECHNICAL FIELD

The present disclosure relates generally to radiation imaging. More particularly, some embodiments relate to pixels for use in radiation imaging, and related assemblies, systems, and methods. More particularly still, some embodiments relate to a multi-stage pixel architecture and performing synchronous read/integrate radiation imaging using pixels have such an architecture.

BACKGROUND

Radiation imaging systems provide information, or images, of an object under examination or rather interior aspects of the object. For example, in x-ray imaging systems, the object is exposed to radiation, and one or more images are formed based upon the radiation absorbed by the object, or rather an amount of radiation that is able to pass through the object. Typically, highly dense objects absorb (e.g., attenuate) more radiation than less dense objects, and thus an object having a higher density, such as a bone or gland, for example, will appear differently in an image than less dense objects, such as fatty tissue or skin.

A digital x-ray detector allows x-ray images to be captured digitally. Typically, a digital x-ray detector includes a pixelated array coupled with x-ray sensing material, and digital x-ray system includes a digital x-ray detector coupled to a digital image processor. Digital x-ray systems allow the image to be processed by a computer, for example, to adjust an image's brightness and contrast. In this way, subtle details, which may be missed by fixed, limited contrast in traditional screen-film x-ray system, can be detected. Thus, digital x-ray systems produce images having greatly enhanced details visibility compared to images obtained by traditional screen-film x-ray system. The resolution of digital x-ray images is also greatly enhanced compared to the resolution of images obtained using other techniques such as CR scanning.

In medicine, x-ray imaging systems are commonly used to detect broken bones, masses, calcium deposits, without limitation, that are not visible to the naked eye. One type of x-ray image system is a mammography unit, which typically include a radiation source, a collimator, one or more compression paddles, an anti-scatter grid, and an x-ray detector array. The detector array is mounted on a diametrically opposing side of the breast tissue (i.e., an object under examination, also called an "imaging object") from the radiation source and a compression paddle. In mammography, the radiation source emits ionizing radiation that traverses the breast tissue while it is compressed. Radiation that traverses the breast tissue is then detected by the detector array. In screening mammography, flat panel detectors generate, store and read-out x-ray signal, and correction algorithms are used to create one or more two-dimensional images of the imaging object in the latitudinal dimension (e.g., a direction orthogonal to a center x-ray beam and/or substantially parallel to the detector array, without limitation).

While two-dimensional projection x-ray images are useful in mammography and other applications, these images provide little or no resolution in the longitudinal direction (e.g., parallel to the x-ray beam and/or orthogonal to the detector plane formed by the detectors, without limitation). On a breast examination, for example, a two-dimensional, x-ray image cannot provide information about whether a mass in a breast is nearer the radiation source or the detector array. A potentially cancerous mass, for example, may be masked by a dense aspect of the breast, such as a gland, if the mass is on top of the gland or vice versa, for example. Moreover, because objects of interest (e.g., cancerous cells, without limitation) can share similar density information as objects that are not of interest, objects that are not of interest are sometimes mistakenly classified as an object of interest, resulting in a false positive.

Digital tomosynthesis enables a three-dimensional image of an object to be reconstructed from a finite set of two-dimensional projection images of the object by acquiring multiple two-dimensional images from multiple angles, and then reconstituting the data. Using digital tomosynthesis, a certain degree of resolution can be produced in the longitudinal dimension. Typically, in digital breast tomosynthesis systems the x-ray source is rotated during data acquisition, for example, in an arc through a limited angular range, and a set of projection radiographs of the object are acquired by a stationary or tilted detector at discrete locations of the x-ray source along the x-ray source path. In many systems, the digital x-ray detector array and the object are maintained in a stationary or fixed position while the x-ray source is moved to multiple locations in order to obtain a collection of images from different view angles.

The multiple two-dimensional images are synthesized using image reconstruction/processing techniques. A synthesized image may be focused on a tomography plane that is be parallel to the detector plane or may be focused on generating cross-sectional images of an object, e.g., "slices," in either case located at a certain depth along the longitudinal direction. Generally speaking, the two-dimensional projection images are spatially translated with respect to each other, and superimposed in such a way that the images overlap precisely in the tomography plane. Other methods for reconstructing tomographic images may use sophisticated computation techniques similar to those used in computed tomography systems. The location of the tomography plane within the object can be varied, and a two-dimensional image of the object can be obtained for each location of the tomography plane.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
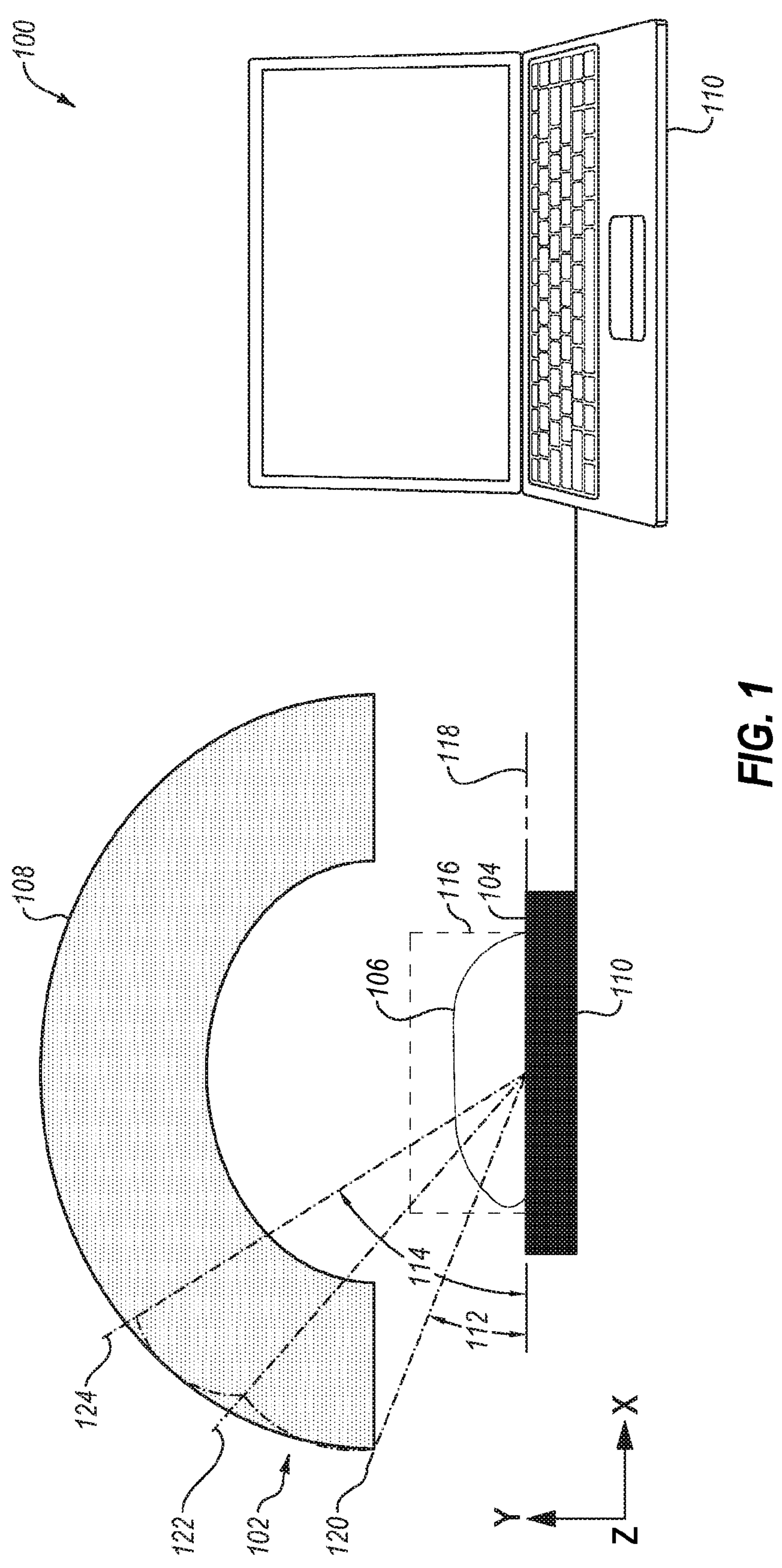
FIG. 1 is a block diagram of an imaging system in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein-all of which are encompassed by use of the term "processor." A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, relational terms, such as "first," "second," "top," "bottom," without limitation, are generally used for clarity and convenience in understanding the disclosure and accompanying drawings and do not connote or depend on any specific preference, orientation, or order, except where the context clearly indicates otherwise. As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise. As used herein, the terms "vertical" and "lateral" refer to the orientations as depicted in the figures.

As used herein, the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

As used herein, "radiation" should generally be understood to mean ionizing radiation; thereby, when radiation is transmitted toward an element, or an element is exposed to radiation, unless otherwise specifically stated, this means and includes ionizing radiation. Ionizing radiation is radiation, traveling as a particle or electromagnetic wave (i.e., a photon), that carries sufficient energy to detach electrons from atoms or molecules, thereby ionizing them, such as x-rays, gamma rays, and some ultraviolet rays, without limitation. Different molecules and atoms ionize at different energies, and so, to some extent, the boundary between non-ionizing and ionizing radiation depends on the molecules in an object being imaged by a radiation imaging system.

It should be appreciated that energy per photon and/or a degree of radiation exposure may depend on context. As non-limiting examples, a specific imaging application (e.g., medical screening, medical diagnostic, medical procedure guidance, industrial inspection, security inspection and/or detection, without limitation), an environment in which radiation imaging systems are deployed, and/or regulatory requirements.

A single photon traveling substantially in a specific direction relative to a source of the photon may be referred to herein as a "ray of radiation" or just a "-ray" (e.g., an x-ray or a gamma-ray, without limitation). A grouping of photons traveling substantially in a direction relative to a source or sources may be referred to herein as a "beam" of radiation or a "radiation beam." The photons of a radiation beam may carry or have an energy per photon or different energy per photon, that is, a radiation beam may carry and/or deliver energy over a spectrum.

As used herein, the term "pixel" means an imaging element of a detector. A detector may, as a non-limiting example, comprise pixels arranged in rows and columns.

X-ray imaging systems are sometimes used for viewing the interior of an object or objects. For example, x-ray imaging may be used for analyzing the contents of a package, luggage, without limitation, without opening the object. In another example, x-ray imaging may be used to view inside a human or animal to diagnose a problem (e.g., broken bones, internal bleeding, arthritis, cavities, damaged organs, without limitation) or provide early detection of problems (e.g., via cancer screenings, mammograms, without limitation). X-ray imaging systems generally include a radiation source (e.g., an x-ray tube-based x-ray generator or a solid-state based x-ray generator, without limitation) and a detector (e.g., photographic plate, X-ray film, image plates, flat panel detectors, without limitation). X-ray imaging systems typically create a two-dimensional image in a plane of the detector. For some applications a single two-dimensional image is sufficient. However, in some applications three-dimensional images or at least images from different angles are desirable or even required to more accurately represent contents of the object and/or patient, for example, to represent the contents in both a lateral and a vertical plane.

X-ray imaging systems may be configured to capture images from different angles of an object that can then be compiled or combined to create a three-dimensional image or representation of the inside of the object through, for example, tomography or other three-dimensional reconstruction methods. One or more of the radiation sources and the detector may be configured to rotate relative to the object to capture images at different angles.

FIG. 1 illustrates an x-ray imaging system 100, according to various embodiments of the disclosure. The x-ray imaging system 100 may include a radiation source 102 configured to supply radiation in continuous or step-and-shoot mode in a direction toward a detector plane 104 that includes an active surface co-planar with plane 118 (plane 118 is depicted by a dashed line in FIG. 1). An object 106 may be positioned between the radiation source 102 and the detector plane 104, such that radiation (e.g., beams of radiation including rays 120, 122 and 124, without limitation) travels from the radiation source 102 through the object 106 to the detector plane 104. The radiation source 102 may be configured to rotate through the arc path 108 defined by, e.g., a gantry, relative to the object 106. In some embodiments, the detector plane 104 may be configured to rotate relative to the object 106 as well. In some embodiments, the detector plane 104 may be configured to remain stationary relative to the object 106 and the radiation source 102.

Detector plane 104 may include a number of pixels (e.g., detectors, x-ray detectors, without limitation) in an array and/or matrix arrangement, without limitation. Each pixel may be configured to collect and store charge based on the amount of radiation absorbed by an x-ray convertor coupled to charge collection electrode of each individual pixel. The respective charge-storage capacitor of each pixel converts collected charges to voltage that may be amplified by an amplifying transistor operated as a source follower, then read by signal processing circuitry and recorded at computing device 110 (e.g., computer, monitor, monitoring system, without limitation) to create a digital representation of an image. The number of pixels, the size of the pixels, and/or their arrangement on the detector plane 104 are important and affect the resolution of the detector plane 104 and may vary. In some embodiments, the pixels may have a size (e.g., pitch) between about 40 μm and about 80 μm, such as between about 48 μm and about 60 μm, between about 48 μm and about 54 μm, or between about 54 μm and about 60 μm.

During a contemplated operation of x-ray imaging system 100, radiation source 102 may begin by suppling radiation at an initial angle of incidence 112 relative to an object 106 and/or the detector plane 104. As the radiation source 102 moves relative to the object 106 located in an examination region 116, radiation source 102 may supply radiation at other angles of incidence, such as angle of incidence 114, along arc path 108. While the radiation source 102 radiates the object 106, the pixels of detector plane 104 collect charge through a change in the angle of incidence 114.

Computing device 110 may observe a signal present on each pixel (e.g., pixel by pixel, groups of pixels, or all of the pixels, without limitation) and non-destructively read (i.e., without erasing a pixel voltage) or destructively read (i.e., erasing a pixel voltage) at specified intervals (e.g., frames). Computing device 110 may record values representative of one or more charge integrate/read cycles for a pixel.

In some embodiments, the computing device 110 may only observe, read, and/or erase signals for a subset of the number of pixels of detector plane 104 at a given instance (e.g., one pixel, two pixels, three pixels, four pixels, without limitation). The collection of charges by charge collection electrodes under x-ray converters of one or more pixels between end of read and/or reset and read event is referred to herein as an "integration process."

In some embodiments, noise and interference may be introduced into an image (e.g., into charge integration, charge storage, recorded values, without limitation) due to a difference in time each pixel and/or row of pixels is read out following exposure to the radiation during the integration process. Additionally, or alternatively, noise and interference may be introduced into an image due to a different solid angle each pixel "has seen" during gantry motion. A difference in time between a time that a first pixel is read and a time that a last pixel is read during an integration process may be but not limited to, between about 20 milliseconds and about 60 milliseconds, such as between about 28 milliseconds and about 55 milliseconds, or between about 20 milliseconds and about 40 milliseconds.

In some embodiments, computing device 110 may trigger a scan of a group of pixels row-by-row. The computing device 110 may trigger a row-by-row scan of a group of pixels with a constant delay between rows resulting in a same integration period for each row. A row-by-row scan with uniform integration period for each row is referred to herein as a "rolling shutter" readout mode.

In a contemplated operation of a rolling shutter, pixels in each row may be read at substantially the same time. As discussed herein, noise and/or interference in the read operation will likely be due to a delay between a first row read and a last row read. Computing device 110 may globally reset all the pixels or group of pixels at substantially the same time after having completed the read of these pixels in the array. A global reset may provide the same starting point for a next integration period for all of the reset pixels. In some cases, there may still be a difference between a solid angle of a gantry motion as radiation being delivered, "seen" by the pixels-because of the length of time required for the computing device to read through all of the pixels in the array from the first to the last row in a rolling shutter readout mode as radiation is being delivered.

Figure 2:
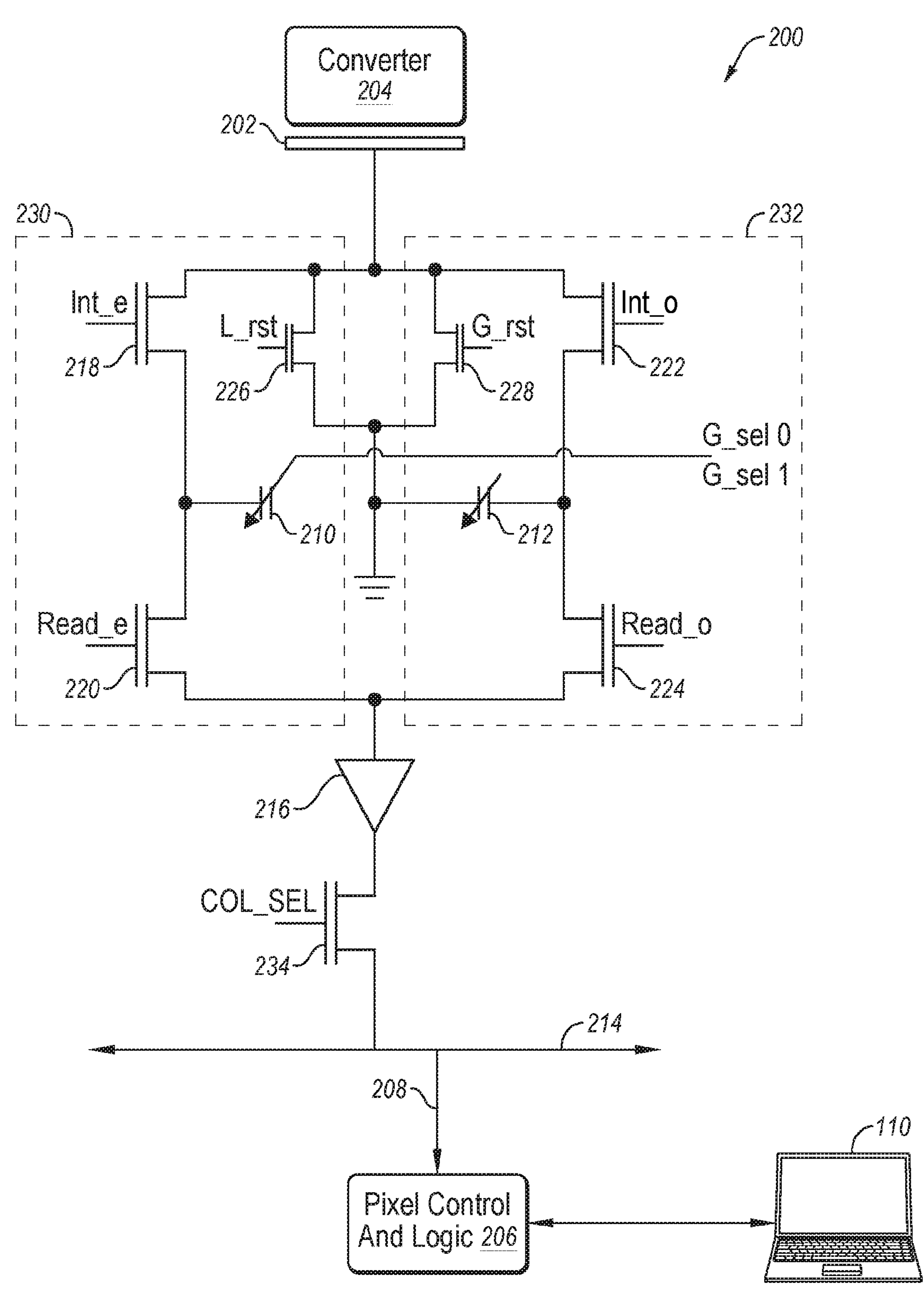
FIG. 2 is a schematic diagram of a detector element (e.g., a pixel, without limitation) in accordance with one embodiment or more embodiments.

FIG. 2 illustrates a multi-stage (here a two stage) CMOS pixel architecture, in accordance with one or more embodiments. Among other things, a two-stage CMOS pixel architectures described herein enables pixel 200 to continuously integrate charge at one stage while computing device 110 simultaneously reads, records, and/or resets signal at the other stage.

Pixel 200 (which may also be referred to, generally, as a "detector element" or a "pixel element") is configured, generally, to provide image data (in FIG. 2, pixel signal 208) that is proportional to (which may be further characterized as "representative of") the intensity of an incident x-ray radiation at a location of pixel 200. Converter 204 may be configured to convert the radiation of an x-ray beam into electrical charge in a "direct" or an "indirect" manner (i.e., direct using photoconductor or indirect using combination of scintillator and a light sensor such as a photodiode, without limitation). In a direct conversion configuration of converter 204, a photoconductor of converter 204 may be formed from a photoconductive material such as amorphous selenium (a-Se), cadmium zinc telluride (CZT), lead iodide (PbI2), mercury iodide (HgI2), lead oxide (PbO), Perovskite, without limitation. Such a photoconductor may become electrically conductive due to absorption of radiation resulting in charge generation, drift of the charge carriers through (which may be further characterized as "transition through") photoconductive layer 204 under applied electric field and its subsequent collection through charge collection electrode 202, with the amount of charge proportional to (which may be further characterized as "representative of") the amount of radiation absorbed.

In an indirect conversion configuration of converter 204, a scintillator converts absorbed x-ray radiation to optical light, which is then converted by photodetector (such as a photodiode, without limitation), into electrical charge.

Charge may be integrated on (which may be further characterized as "collected by") the capacitor 210 and capacitor 212 by way of charge collection electrode 202. The collected charge may be converted to voltage, and the voltage may be amplified by gain stage 216 (e.g., a high-gain differential amplifier operated in follower mode, without limitation) and read through a common signal processing circuitry (i.e., shared among a number of pixels, without limitation) via select device 234. In the embodiment shown in FIG. 2, pixel signal 208 may be read via a common bus, i.e., analog bus 214, by pixel control and logic 206 and recorded at computing device 110. Upon reading or reading/recording charge from capacitors 210/212, the capacitor may optionally be reset via respective reset devices, here, reset device 226 or reset device 228 (e.g., using signals L_rst and G_rst), as the case may be.

After a capacitor is reset (by activating reset device 226 or 228), integrating device 218 or integrating device 222, may be turned on via signals Int_e and Int_o, respectively, to allow charging of a capacitor by charge flow through converter 204 which are electrically connected via charge collection electrode 202. Charge may be stored at capacitor 212 or capacitor 210, until, for example, a pixel voltage (i.e., pixel signal 208) is again read and recorded for a next frame.

In the embodiment shown in FIG. 2, pixel 200 includes a first stage 230 and a second stage 232, each of which is separately operable to be coupled to charge collection electrode 202 and/or pixel control and logic 206, such that at a given instant, one of the stages may be operably coupled to charge collection electrode 202 and the other one of the stages may be operably coupled to pixel control and logic 206.

In a contemplated operation of pixel 200, first stage 230 integrates charge while second stage 232 is read. Integration at first stage 230 is activated by turning on integrating device 218 (e.g., a transistor, without limitation) via signal Int_e such that charge may be collected at the capacitor 210. Turning on integrating device 222 (e.g., a transistor, without limitation) forms a path from charge collection electrode 202 to be integrated onto capacitor 212.

Reading at second stage 232 is activated by turning on reading device 224 (e.g., readout transistor) via signal Read_o, while integrating device 222 is "off." Turning on reading device 224 provides a path from capacitor 212 to pixel output buffer, where a signal (i.e., a pixel signal) corresponding to the charge may be amplified at gain stage

216, e.g., by a differential amplifier module, operated in a follower mode and provided to pixel control and logic 206 via analog bus 214.

While the charge is being integrated onto capacitor 210, computing device 110 may read and record a digitized pixel signal corresponding to pixel signal 208 (which may be converted to voltage). In the contemplated example, pixel signal 208 corresponds to the charge collected at capacitor 212. Upon reading/recording the pixel signal 208 corresponding to the charge collected at capacitor 212, and in preparation for the next X-ray signal integration onto capacitor 212 reset device 226 is turned on (e.g., when a reset transistor is activated, without limitation), which resets capacitor 212 to a predefined value.

In a next cycle, first stage 230 may be read by turning on reading device 220 via signal Read_e, and pixel signal 208 corresponding to charge collected at capacitor 210 may be read while second stage 232 is integrating, and so on and so forth.

Notably, in an embodiment of a detector plane 104 that includes pixels 200, all pixels 200 of detector plane 104 may be reset at the same time as described herein. Simultaneous reset enables signal integration start of all pixels 200 at the same time (i.e., during the same integration period), and more specifically, integrating information from the same angle of incidence at the same time at multiple pixels 200. Moreover, all of the pixels 200 may continue with a next integration period by utilizing the two charge banks of pixel 200, i.e., the charge banks of first stage 230 and second stage 232, one bank used for integration in the next integration period while the other bank is used for readout.

In some embodiments, each capacitor 210 and capacitor 212 may have substantially the same charge capacity. For example, the capacitor 210 and capacitor 212 may have a charge capacity between about 0.05 Pico Coulomb (pC) and about 4 pC, such as between about 1 pC and about 3 pC, between about 1.1 pC and about 1.5 pC, or about 1.2 pC.

Figure 3:
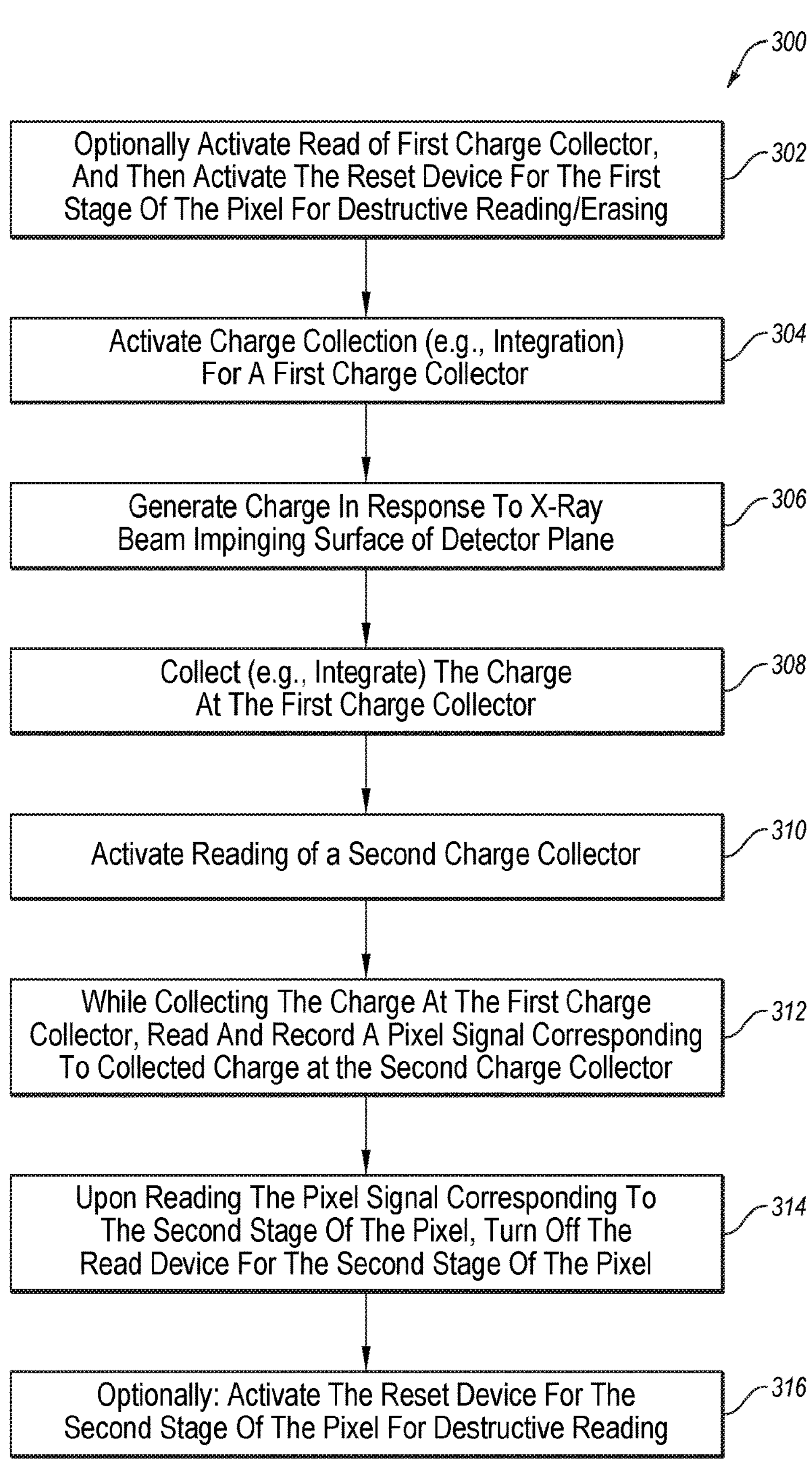
FIG. 3 illustrates a process in accordance with one or more embodiments.

FIG. 3 illustrates a flowchart of a process 300 for acquiring image data from a pixel, including without limitation a pixel 200, in accordance with one or more embodiments.

In operation 302, process 300 optionally reads out and then resets the first charge collector thereby performing a destructive read out with erasing/reset of the first charge collector and the pixel more generally prior to starting a current integration period.

In operation 304, process 300 activates charge integration for a first charge storage element. In one embodiment, charge integration may be activated by turning on an integrating device associated with the first charge storage element (e.g., integrating device 218 or integrating device 222 of FIG. 2).

In operation 306, process 300 generates charge in response to an x-ray beam impinging a surface of a detector plane. In one embodiment, the charge may be generated by converter 204 and deposited onto (which may be further characterized as "transferred to") a charge collector (e.g., capacitor 212 via charge collection electrode 202).

In operation 308, process 300 collects the charge generated in operation 306 at the first charge collector, i.e., the charge collector activated in operation 304; and converts this charge to voltage.

In operation 310, process 300 activates a reading of a second charge collector. In one embodiment, reading may be activated by turning on a reading device (e.g., reading device 220 or reading device 224). Notably, reading may be activated prior to activating charge collection for the first charge collector in operation 304, or may be activated while collecting charge at the first charge collector.

In operation 312, while collecting the charge at the first charge collector, process 300 reads and records a pixel signal corresponding to collected charge at the second charge collector.

In operation 314, process 300 de-activates reading of the second charge collector in response to finishing reading the pixel signal. In one embodiment, reading may be de-activated by turning off a reading device (e.g., reading device 220 or reading device 224).

In optional operation 316, process 300 resets the second charge collector thereby, in conjunction with reading the second charge collector in operations 312, 314, performing a destructive read out of the second charge collector and the pixel more generally.

In cases where optional operation 316 is not performed, process 300 performs a non-destructive read-out of a charge collector and the pixel more generally. In some cases the image data (a frame) read in process 300 may be for a final, ultimately reconstructed, image of image data. In some cases the image data read in process 300 may be incorporated into a frame of image data before the final image is generated. As a non-limiting example, multiple reads may be performed of a given pixel and then several frames are averaged to form a final frame of image data for image reconstruction (e.g., for clinical image reconstruction or inspection image reconstruction, without limitation).

Figure 4:
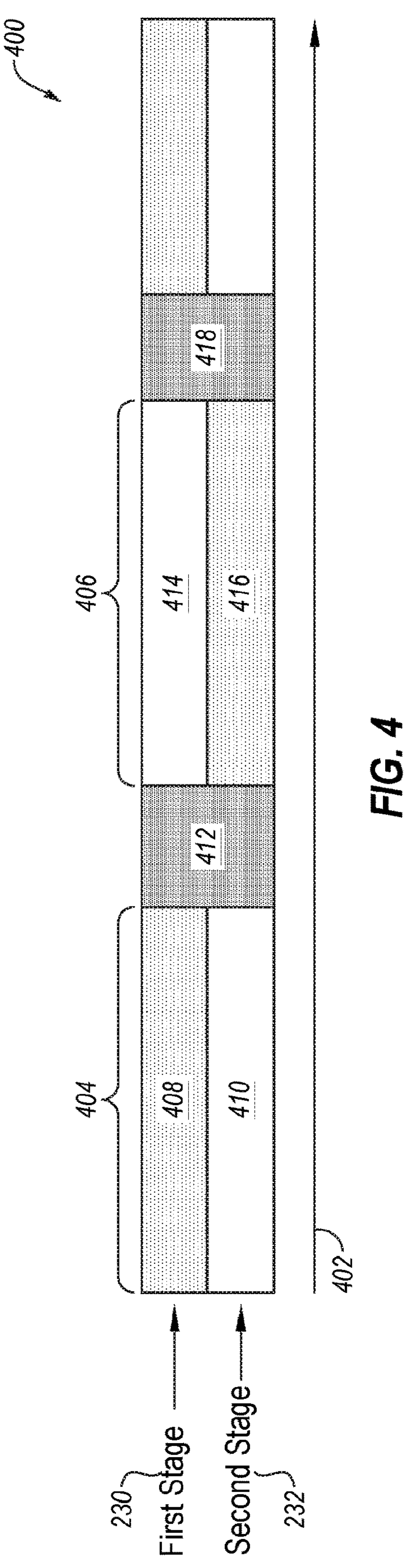
FIG. 4 illustrates a frame capture process in accordance with one or more embodiments.

FIG. 4 illustrates timeline of an embodiment of a frame capture process 400, performed, for example, by an x-ray imaging system 100 using pixel 200. The timeline shown in FIG. 4 illustrates a first frame capture 404 and a second frame capture 406 performed over a time period, time 402. Each depicted frame capture is performed, at least in part, at a first stage and a second stage, e.g., first stage 230 and second stage 232 of FIG. 2. The x-ray imaging system 100 (see FIG. 1) may capture image data from the pixel 200 by first frame capture 404 and second frame capture 406.

As shown in FIG. 4, during first frame capture 404, the first stage 230 integrates charge from the charge collection electrode during first integration phase 408. During the same period of time, the charge previously integrated in the second stage 232 (i.e., integrated during the previous integration period) is read and may be recorded by computing device 110 one or more times (e.g., multiple non-destructive reads to reduce readout noise, without limitation) during first reading phase 410. In some embodiments, the second stage 232 may only be actively read and/or recorded during a portion of the first reading phase 410 as the computing device 110 may be reading and/or recording each of the pixels in an array of pixels individually or row by row. During the first reading phase 410, the second stage 232 may be in a ready to read state at all times (i.e., during operation) before and/or after being read and/or recorded by computing device 110.

After the first reading phase 410 of the second stage 232 (and in this specific example, after the first integration phase 408 of the first stage 230), and before the start of second integration phase 416, first reset phase 412 is performed for second stage 232. During first reset phase 412 the pixel signal at second stage 232 may be erased (e.g., reset device 226 may be activated prior to integrating device 222 being activated), integrating at second stage 232 may be activated (e.g., integrating device 222 may be turned on after erasing the pixel signal).

Meanwhile, integrating at first stage 230 may be deactivated (e.g., integrating device 218 may be turned off), and reading may be activated for first stage 230 (e.g., reading device 220 may be turned on; after the reading for the second stage 232 was finished).

First reset phase 412 effectively resets a charge storage device of the second stage 232, by activating reset device 226 prior to the integrating device 222 (e.g., a switch such as a transistor, without limitation) of the second stage 232 being activated (i.e., to perform a local reset).

While a reset phase is depicted in FIG. 4 for a pixel, a reset phase (e.g., first reset phase 412 and/or first reset phase 418, without limitation) may be applied globally to a row of pixels or a matrixed array of pixels (e.g., of a detector plane such as detector plane 104 of FIG. 1, without limitation), at substantially the same time. A global reset discussed herein may enable each respective first stage 230 or second stage 232 (e.g., of the pixels 200 of a detector plane 104, without limitation) that are going to begin an integrating phase to be reset at the same time.

During second frame capture 406, the second stage 232 may enter second integration phase 416 having been reset during first reset phase 412. First stage 230 may enter second reading phase 414 (without reset) to read a pixel signal corresponding to the charge collected during first integration phase 408.

This process may repeat for each frame of a number of frames for image capture of object 106, e.g., taken across part or all of the entire arc path 108. Generally speaking, each such frame may correspond to a separate two-dimensional image that may be constructed using array addresses of each pixel from the array of pixels. Similarly, a three-dimensional image may be reconstructed using the two-dimensional images constructed for each frame, as discussed herein.

In some embodiments, the x-ray imaging system 100 using pixel 200 may also utilize offset correction/cancellation as discussed in relation to frames of image data captured, e.g., according to frame capture process 400. For example, each of the first reading phase 410 and second reading phase 414 may include an X-ray image reading phase and a dark image reading phase (e.g., where a frame is captured without radiation or an inconsequential amount of radiation, such a frame sometimes referred to as a "dark frame"), where the dark image reading phase takes place immediately after the reset phase in order to capture an offset frame (i.e., the dark frame or a modified version (e.g., modified by some post processing, without limitation) is used as an "offset frame"), but prior to the next integration phase and subsequent readout of the integrated signal. Offset correction may include, as a non-limiting example, subtracting an offset frame from an image frame (e.g., cancelling the offset signals from the image frame signals, without limitation). In some embodiments, the offset frame subtracted from an image frame may be a noise-reduced offset frame. As non-limiting examples, a noise reduced offset frame may be generated by performing one or more of capturing several offset frames and averaging the several offset frames, and filtering an offset frame (e.g., filtering a captured offset, or an offset frame that is the average of several offset frames, without limitation) for desired corrections (e.g., related to temperature drift, electromagnetic interference, without limitation).

Figure 5:
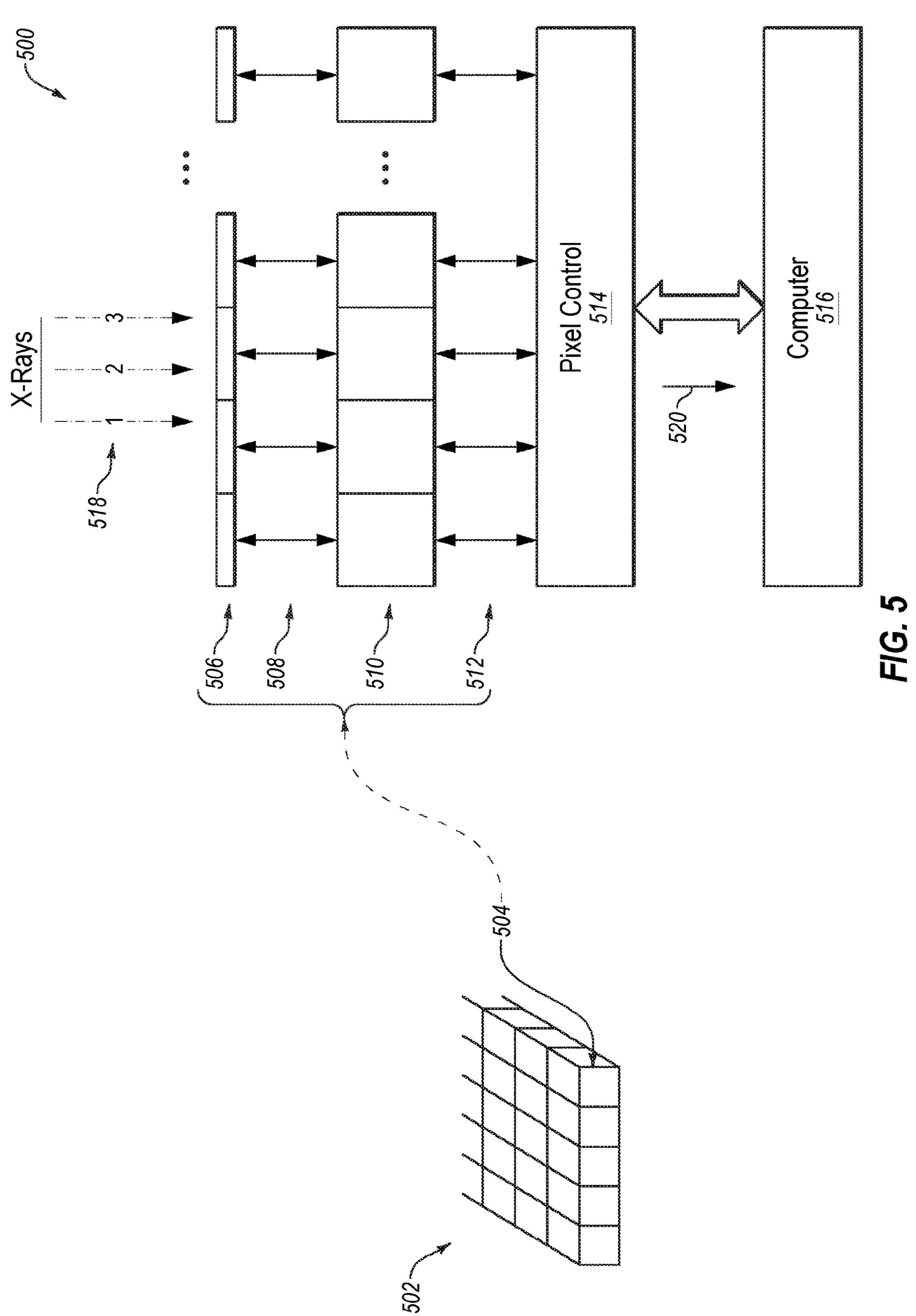
FIG. 5 illustrates a system in accordance with one or more embodiments.

FIG. 5 illustrates a schematic diagram of an array of pixels 500, in accordance with one or more embodiments.

Shown is a detector panel 502 including a pixel matrix further including number of pixels 200 of FIG. 2 arranged in a number of rows. A diagram of pixel row 504 is shown to the right of detector panel 502 in FIG. 5. Pixel row 504 includes x-ray converters 506, charge 508, pixels 510, pixel control 514 and computer 516. As shown in FIG. 5, during a capture of a frame of image data, charge 508 is provided by x-ray converters 506 to pixels 510 in response to x-rays 518 (x-rays are shown for three frame captures in time, capture 1, capture 2 and capture 3, with the x-ray source in different positions for each such capture) interacting with x-ray converters 506. While charge 508 is collected at pixels 510, computer 516 reads image data 520 from pixel row 504 (e.g., pixel signals include signals 512 between pixel control 514 and pixels 510). As discussed herein, image data that computer 516 reads may corresponds to a frame captured during an immediately previous frame capture event.

After reading all of the rows of detector panel 502, including without limitation, pixel row 504, computer 516 may instruct pixel control 514 to perform a global reset. Pixel control 514, in response to the global reset instruction from computer 516, simultaneously activates the reset devices of the pixels of detector panel 502 using control signals of signals 512, e.g., as described herein.

Globally shuttering (e.g., performing a global resetting) two stage pixels, according to various embodiments of the present disclosure, may result in the same X-ray information (solid angle) seen by each pixel; reduction in the dead time or time when X-ray signal is lost due to readout; as well as noise, interference, and other distortions in x-ray images. Having capability of simultaneous charge integration and readout on every pixel of the imager combined with the fast frame rate allows to reduce image blur associated with gantry motion as well as patient motion blur, thus improving image resolution; as well as contrast for the small objects. Combining these benefits with reducing the dead time may improve medical x-ray imaging through the accuracy of diagnosis that rely on x-ray images, early detection of potential problems (e.g., cancer, without limitation) in screening and diagnosis. Similarly, applying global shutter functionality in NDT may improve security screenings by finding otherwise hidden threats, and earlier, more accurate threat detection. Higher resolution, contrast, and contrast-to-noise ratio may also improve x-ray inspection processes through improved defect detection.

Reducing interference, improving resolution and contrast in the x-ray imaging may improve industries that rely on x-ray examination by improving accuracy in these industries and reducing false positives and failed images where further inspection is required due to an inability of an operator or user to accurately decipher the x-ray images.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the accompanying claims (e.g., bodies of the accompanying claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following accompanying claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: a radiation imaging system comprising: a radiation source configured to transmit radiation toward an object; a number of pixels arranged in a matrix and configured to integrate and readout an electrical charge corresponding to radiation transmitted through the object that impinges on a number of radiation detector elements; and a computing device configured to capture image data from the number of pixels, wherein the image data is representative of electrical charge collected at each pixel of the number of pixels, wherein each of the number of pixels comprising: a readout component; a reset component; a first stage comprising a first charge storage component and a first readout component; a second stage comprising a second charge storage component and a second readout component; and switches configured to: enable simultaneous read from the first or second stage and integrate at the other of the first or second stage, and selectively enable the reset component.

Embodiment 2: the radiation imaging system according to Embodiment 1, wherein each of number of pixels are individually coupled to a respective radiation photoconductor via charge collection electrode, or individually coupled to a scintillator and a photodetector, in a direct or indirect radiation conversion arrangement, respectively.

Embodiment 3: the radiation imaging system according to any of Embodiments 1 and 2, wherein the photodetector is photoconductive or photovoltaic.

Embodiment 4: the radiation imaging system according to any of Embodiments 1 to 3, wherein the switches comprise: a first reading device configured to alternately enable and disable readout of the first charge storage component; a second reading device configured to alternately enable and disable readout of the second charge storage component; a first integrating device configured to alternately enable and disable charge integration at the first charge storage component; a second integrating device configured to alternately enable and disable charge integration at the second charge storage component; and reset devices configured to selectively enable storage component reset for a given pixel, row of pixels or all the pixels.

Embodiment 5: the radiation imaging system according to any of Embodiments 1 to 4, wherein each of the number of pixels is configured to alternately enable and disable readout of the first charge storage component and the second charge storage component.

Embodiment 6: the radiation imaging system according to any of Embodiments 1 to 5, wherein each of the number of pixels is configured to alternately enable and disable charge integration at the first charge storage component and the second charge storage component.

Embodiment 7: the radiation imaging system according to any of Embodiments 1 to 6, wherein each of the number of pixels is configured to alternately enable and disable: simultaneous charge integration at the first charge storage component and readout of the second charge storage component; and simultaneous charge integration at the second charge storage component and readout of the first charge storage component.

Embodiment 8: the radiation imaging system according to any of Embodiments 1 to 7, wherein the first charge storage component and the second charge storage component comprises a programmable capacitor.

Embodiment 9: the radiation imaging system according to any of Embodiments 1 to 8, wherein the first charge storage component and the second charge storage component has a programmable charge capacity for the charge range between about 0.05 Pico Coulomb (pC) and about 4 pC.

Embodiment 10: the radiation imaging system according to any of Embodiments 1 to 9, wherein each of the number of pixels further comprising a reset component.

Embodiment 11: a radiation detector element, comprising: a radiation conversion stage; a first stage comprising a first charge storage component; a second stage comprising a second charge storage component; and one or more devices arranged to separate reset, charge integration, and readout of the first charge storage component and of the second charge storage component.

Embodiment 12: the radiation detector element according to Embodiment 11, further comprising at least one device of the one or more devices configured to operably couple the radiation conversion stage to at least one of the first charge storage component and the second charge storage component.

Embodiment 13: the radiation detector element according to any of Embodiments 11 and 12, wherein a device of the one or more devices is configured to reset at least one of the first charge storage component and the second charge storage component.

Embodiment 14: the radiation detector element according to any of Embodiments 11 to 13, wherein a device of the one or more devices is configured to enable readout of a signal from the first charge storage component or the second charge storage component.

Embodiment 15: the radiation detector element according to any of Embodiments 11 to 14, wherein a photodetector of the radiation conversion stage comprises a direct conversion photoconductor or a combination of a scintillator and a photovoltaic material or a photoconductive material.

Embodiment 16: the radiation detector element according to any of Embodiments 11 to 15, wherein the direct conversion photoconductor includes a material comprising one or more of: amorphous selenium, perovskite, cadmium zinc telluride, lead iodide, mercury iodide, and lead oxide.

Embodiment 17: the radiation detector element according to any of Embodiments 11 to 16, further comprising a charge isolation element arranged to isolate a data bus from a pixel.

Embodiment 18: the radiation detector element according to any of Embodiments 11 to 17, further comprising a gain stage configured to amplify a pixel signal readout of the first charge storage component or the second charge storage component.

Embodiment 19: the radiation detector element according to any of Embodiments 11 to 18, wherein the gain stage comprises an amplifier configured to operate as a differential amplifier in a follower mode when amplifying the pixel signal.

Embodiment 20: a method of capturing radiation information from a pixel, the method comprising: collecting, at a first charge storage device, a first charge provided by a radiation converter in response to a first radiation beam incident the radiation converter at a first angle; generating and digitizing a first pixel signal representative of the first charge collected at the first charge storage device; collecting, at a second charge storage device, a second charge provided by the radiation converter in response to a second radiation beam incident the radiation converter at a second angle; generating and digitizing a second pixel signal representative of the second charge collected at the second charge storage device; and optionally resetting the first charge storage device and the second charge storage device before collecting the first charge and the second charge, respectively.

Embodiment 21: the method of Embodiment 20, further comprising: capturing an offset frame; and cancelling at least some offset artifacts in an image frame using the offset frame.

Embodiment 22: a method of capturing radiation information, the method comprising: resetting charge storage devices of a row of pixels; simultaneously starting collection, at the charge storage devices of the row of pixels, of charge provided by radiation converters in response to radiation beams incident to the radiation converters; and generating a frame of image data by digitizing pixel signals representative of the charge collected at the charge storage devices of the row of pixels.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A radiation imaging system comprising:

a radiation source configured to transmit radiation toward an object;

a number of pixels arranged in a matrix and configured to integrate and readout an electrical charge corresponding to radiation transmitted through the object that impinges on a number of radiation detector elements; and a computing device configured to capture image data from the number of pixels, wherein the image data is representative of electrical charge collected at each pixel of the number of pixels, wherein each of the number of pixels comprising:

a first stage comprising a first reset component, a first charge storage component, and a first readout component; and a second stage comprising a second reset component, a second charge storage component, and a second readout component; and the first reset component, the first charge storage component, the first readout component, the second reset component, the second charge storage component, and the second readout component are switchably controllable to: selectively enable simultaneous read from the first or second stage and integrate at the other of the first or second stage, and selectively enable independent reset of the first or second stage.

2. The radiation imaging system of claim 1, wherein each of number of pixels are individually coupled to a respective radiation photoconductor via charge collection electrode, or individually coupled to a scintillator and a photodetector, in a direct or indirect radiation conversion arrangement, respectively.

3. The radiation imaging system of claim 2, wherein the photodetector is photoconductive or photovoltaic.

4. The radiation imaging system of claim 1, comprising: enable and disable readout of the a first integrating device configured to alternately enable and disable charge integration at the first charge storage component; and a second integrating device configured to alternately enable and disable charge integration at the second charge storage component.

5. The radiation imaging system of claim 1, wherein each of the number of pixels is configured to alternately enable and disable readout of the first charge storage component and the second charge storage component.

6. The radiation imaging system of claim 1, wherein each of the number of pixels is configured to alternately enable and disable charge integration at the first charge storage component and the second charge storage component.

7. The radiation imaging system of claim 1, wherein each of the number of pixels is configured to alternately enable and disable:

simultaneous charge integration at the first charge storage component and readout of the second charge storage component; and simultaneous charge integration at the second charge storage component and readout of the first charge storage component.

8. The radiation imaging system of claim 1, wherein the first charge storage component and the second charge storage component comprises a programmable capacitor.

9. The radiation imaging system of claim 8, wherein the first charge storage component and the second charge storage component has a programmable charge capacity for a charge range between about 0.05 Pico Coulomb (pC) and about 4 pC.

10. The radiation imaging system of claim 1, wherein each of the number of pixels further comprising a reset component.

11. The radiation imaging system of claim 1, wherein the first reset component is directly coupled to the first charge storage component, and the second reset component is directly coupled to the second charge storage component, such that activation of the first reset component resets the first charge storage component independently of charge stored at the second charge storage component.

12. The radiation imaging system of claim 11, wherein the first reset component is configured to reset the first charge storage component while the second readout component simultaneously reads out the second charge storage component.

13. A radiation detector element, comprising:
- a radiation conversion stage;
- a first stage comprising dedicated ones of: a first reset component, a first readout component, and a first charge storage component;
- a second stage comprising dedicates ones of: a second reset component, a second readout component, and a second charge storage component; and
- first and second sets of devices respectively arranged for separate reset, charge integration, and readout of the first charge storage component and of the second charge storage component.

14. The radiation detector element of claim 13, further comprising at least one device of the one or more devices configured to operably couple the radiation conversion stage to at least one of the first charge storage component and the second charge storage component.

15. The radiation detector element of claim 14, wherein a device of the one or more devices is configured to reset at least one of the first charge storage component and the second charge storage component.

16. The radiation detector element of claim 13, wherein a device of the one or more devices is configured to enable readout of a signal from the first charge storage component or the second charge storage component.

17. The radiation detector element of claim 13, wherein a photodetector of the radiation conversion stage comprises a direct conversion photoconductor or a combination of a scintillator and a photovoltaic material or a photoconductive material.

18. The radiation detector element of claim 17, wherein the direct conversion photoconductor includes a material comprising one or more of: amorphous selenium, perovskite, cadmium zinc telluride, lead iodide, mercury iodide, and lead oxide.

19. The radiation detector element of claim 13, further comprising a charge isolation element arranged to isolate a data bus from a pixel.

20. The radiation detector element of claim 13, further comprising a gain stage configured to amplify a pixel signal readout of the first charge storage component or the second charge storage component.

21. The radiation detector element of claim 20, wherein the gain stage comprises an amplifier configured to operate as a differential amplifier in a follower mode when amplifying the pixel signal.

22. The radiation detector element of claim 13, wherein the first reset component is directly coupled to the first charge storage component, and the second reset component is directly coupled to the second charge storage component, such that the first charge storage component and the second charge storage component are independently resettable without cross-interference through a shared node.

23. A method of capturing radiation information from a pixel, the method comprising:
- collecting, at a first charge storage device, a first charge provided by a radiation converter in response to a first radiation beam incident the radiation converter at a first angle;
- generating and digitizing a first pixel signal representative of the first charge collected at the first charge storage device;
- collecting, at a second charge storage device, a second charge provided by the radiation converter in response to a second radiation beam incident the radiation converter at a second angle;
- generating and digitizing a second pixel signal representative of the second charge collected at the second charge storage device; and
- individually and selectively resetting the first charge storage device at a first reset phase before collecting the first charge, and individually and selectively resetting the second charge storage device at a second reset phase before collecting the second charge, the first reset phase and the second reset phase being different phases.

24. The method of claim 23, further comprising:
- capturing an offset frame; and
- cancelling at least some offset artifacts in an image frame using the offset frame.

25. The method of claim 23, wherein individually and selectively resetting the first charge storage device comprises activating a first reset device directly coupled to the first charge storage device, and individually and selectively resetting the second charge storage device comprises activating a second reset device directly coupled to the second charge storage device, wherein the first reset device and the second reset device are distinct devices.

26. A method of capturing radiation information, the method comprising:
- simultaneously:
  - resetting first charge storage devices of a row of pixels; and
  - starting collection, at second charge storage devices of the row of pixels, of charge provided by radiation converters in response to radiation beams incident to the radiation converters; and
- generating a frame of image data by digitizing pixel signals representative of the charge collected at the charge storage devices of the row of pixels.

27. The method of claim 26, wherein resetting the first charge storage devices comprises activating respective first reset devices each directly coupled to a respective one of the first charge storage devices, and wherein charge stored at the second charge storage devices is isolated from the respective first reset devices during the resetting.

* * * * *